(12) United States Patent
Asai (10) Patent No.: US 11,177,534 B2
(45) Date of Patent: Nov. 16, 2021

(54) BINDER COMPOSITION FOR NON-AQUEOUS SECONDARY BATTERY POROUS MEMBRANE, SLURRY COMPOSITION FOR NON-AQUEOUS SECONDARY BATTERY POROUS MEMBRANE, POROUS MEMBRANE FOR NON-AQUEOUS SECONDARY BATTERY, AND NON-AQUEOUS SECONDARY BATTERY

(71) Applicant: ZEON CORPORATION, Tokyo (JP)

(72) Inventor: Kazuki Asai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 76 days.

(21) Appl. No.: 16/492,317

(22) PCT Filed: Mar. 13, 2018

(86) PCT No.: PCT/JP2018/009804
§ 371 (c)(1),
(2) Date: Sep. 9, 2019

(87) PCT Pub. No.: WO2018/180472
PCT Pub. Date: Oct. 4, 2018

(65) Prior Publication Data
US 2020/0052274 A1 Feb. 13, 2020

(30) Foreign Application Priority Data
Mar. 31, 2017 (JP) ............................. JP2017-072472

(51) Int. Cl.
*H01M 2/16* (2006.01)
*H01M 50/411* (2021.01)
(Continued)

(52) U.S. Cl.
CPC ......... *H01M 50/411* (2021.01); *C08F 220/18* (2013.01); *C08K 5/42* (2013.01);
(Continued)

(58) Field of Classification Search
CPC ............. H01M 10/052; H01M 50/449; H01M 10/4235; H01M 4/622; H01M 50/403;
(Continued)

(56) References Cited

U.S. PATENT DOCUMENTS

2016/0351873 A1 12/2016 Tomokazu
2017/0162846 A1* 6/2017 Ogata .................. B32B 25/047

FOREIGN PATENT DOCUMENTS

EP 2908364 A1 8/2015
EP 3104445 A1 12/2016
(Continued)

OTHER PUBLICATIONS

Oct. 1, 2019, International Preliminary Report on Patentability issued in the International Patent Application No. PCT/JP2018/009804.

(Continued)

*Primary Examiner* — Jonathan G Jelsma
*Assistant Examiner* — Omar M Kekia
(74) *Attorney, Agent, or Firm* — Kenja IP Law PC (57) ABSTRACT

Disclosed is a binder composition for a non-aqueous secondary battery porous membrane which comprises: a particulate polymer; a sulfosuccinic acid ester and/or a salt thereof; and water, wherein the particulate polymer has a surface acid amount S of 0.05 mmol/g or more and 0.50 mmol/g or less, and a ratio L/S which is a ratio of an acid amount L in a liquid phase of the binder composition to the surface acid amount S is 0.1 or more and 0.2 or less.

8 Claims, 1 Drawing Sheet

(51) Int. Cl.
  *C08F 220/18* (2006.01)
  *C08K 5/42* (2006.01)
  *H01M 4/62* (2006.01)
  *H01M 50/449* (2021.01)
  *H01M 10/052* (2010.01)
  *H01M 10/42* (2006.01)
  *H01M 10/0566* (2010.01)
  *H01M 50/403* (2021.01)
  *H01G 11/52* (2013.01)
  *H01G 11/06* (2013.01)
  *C08F 20/18* (2006.01)
  *C08K 3/22* (2006.01)
  *C08K 5/41* (2006.01)
  *C08L 33/12* (2006.01)
  *C08L 33/08* (2006.01)

(52) U.S. Cl.
  CPC ......... *H01M 4/622* (2013.01); *H01M 50/449* (2021.01); *C08F 20/18* (2013.01); *C08F 220/1804* (2020.02); *C08F 2800/20* (2013.01); *C08K 3/22* (2013.01); *C08K 5/41* (2013.01); *C08L 33/08* (2013.01); *C08L 33/12* (2013.01); *H01G 11/06* (2013.01); *H01G 11/52* (2013.01); *H01M 10/052* (2013.01); *H01M 10/0566* (2013.01); *H01M 10/4235* (2013.01); *H01M 50/403* (2021.01); *Y02E 60/10* (2013.01)

(58) Field of Classification Search
  CPC ............. H01M 50/411; H01M 10/0566; C08F 220/18; C08F 2800/20; C08F 20/18; C08F 220/1804; H01G 11/06; H01G 11/52; C08L 33/12; C08L 33/08; C08K 3/22; C08K 5/42; C08K 5/41; Y02E 60/10
  USPC ....................................................... 429/144
  See application file for complete search history.

(56) References Cited

FOREIGN PATENT DOCUMENTS

| | | |
|---|---|---|
| JP | 2013145763 A | 7/2013 |
| JP | 2016048670 A | 4/2016 |
| WO | 2015098507 A1 | 7/2015 |
| WO | 2015145967 A1 | 10/2015 |

OTHER PUBLICATIONS

Dec. 7, 2020, the Extended European Search Report issued by the European Patent Office in the corresponding European Patent Application No. 18777275.1.

* cited by examiner

BINDER COMPOSITION FOR NON-AQUEOUS SECONDARY BATTERY POROUS MEMBRANE, SLURRY COMPOSITION FOR NON-AQUEOUS SECONDARY BATTERY POROUS MEMBRANE, POROUS MEMBRANE FOR NON-AQUEOUS SECONDARY BATTERY, AND NON-AQUEOUS SECONDARY BATTERY

TECHNICAL FIELD

The present disclosure relates to binder compositions for non-aqueous secondary battery porous membranes, slurry compositions for non-aqueous secondary battery porous membranes, porous membranes for non-aqueous secondary batteries, and non-aqueous secondary batteries.

BACKGROUND

Non-aqueous secondary batteries (hereinafter also simply referred to as "secondary batteries") such as lithium ion secondary batteries are small and light, high in energy density, and capable of repeated cycles of charge and discharge. For such characteristics, secondary batteries are used in a wide variety of applications. A secondary battery generally includes battery members, e.g., a positive electrode, a negative electrode, and a separator for separating the positive and negative electrodes from each other to prevent a short-circuit between them. For the purpose of improving the heat resistance and strength of the electrodes (positive and negative electrodes) and/or the separator, a secondary battery may additionally include a porous membrane as a protection layer disposed on the battery member.

Examples of porous membranes include those formed by binding non-conductive particles such as organic and inorganic particles with a binder. Such porous membranes are usually formed by first preparing slurry compositions in which porous membrane materials such as non-conductive particles and binder are dissolved or dispersed in a dispersion medium such as water (hereinafter also simply referred to as "slurry compositions for porous membranes"), applying the slurry compositions on substrates such as electrodes or separators and drying the slurry compositions applied.

In recent years, for the purpose of achieving further improvements in the performance of non-aqueous secondary batteries, improvements of porous membranes have been actively made (see, e.g., PTL 1).

Specifically, for example, PTL 1 proposes improving the durability of porous membranes and the stability at high shear rates of compositions for porous membranes by the use of a binder for non-aqueous secondary battery porous membranes which comprises a particulate polymer which is a random copolymer containing 35% by mass or more of a (meth)acrylic acid alkyl ester monomer unit and 20% by mass or more and 65% by mass or less of an aromatic monovinyl monomer unit.

CITATION LIST

Patent Literature

PTL 1: WO2015/145967A1

SUMMARY

Technical Problem

PTL 1 discloses including an acidic group-containing monomer unit in a particulate polymer as one way of further increasing the stability at high shear rates of slurry compositions for porous membranes. However, increasing the amount of an acidic group-containing monomer unit in the particulate polymer may cause a problem of high water contents in the resulting porous membrane.

An object of the present disclosure is therefore to provide a binder composition for non-aqueous secondary battery porous membranes which can increase the slurry stability at high shear rates of a slurry composition for porous membranes and which can form a porous membrane having a reduced water content.

Another object of the present disclosure is to provide a slurry composition for non-aqueous secondary battery porous membranes which has excellent slurry stability at high shear rates and which can form a porous membrane having a reduced water content.

Still another object of the present disclosure is to provide a porous membrane for non-aqueous secondary batteries which has a reduced water content, and a non-aqueous secondary battery having the porous membrane.

Solution to Problem

The inventor made extensive studies to solve the foregoing problem and established that the use of a binder composition which comprises: a particulate polymer having a surface acid amount S of 0.05 mmol/g or more and 0.50 mmol/g or less; a sulfosuccinic acid ester and/or a salt thereof; and water wherein the ratio of an acid amount L in a liquid phase to the surface acid amount S (L/S) is 0.1 or more and 0.2 or less makes it possible to simultaneously ensure the slurry stability at high shear rates of a slurry composition for porous membranes and a reduced water content of a porous membrane. The inventor thus completed the present disclosure.

Specifically, the present disclosure aims to advantageously solve the foregoing problem, and a disclosed binder composition for non-aqueous secondary battery porous membranes comprises a particulate polymer, a sulfosuccinic acid ester and/or a salt thereof, and water, wherein the particulate polymer has a surface acid amount S of 0.05 mmol/g or more and 0.50 mmol/g or less, and a ratio L/S which is a ratio of an acid amount L in a liquid phase of the binder composition to the surface acid amount S is 0.1 or more and 0.2 or less. By using a binder composition which comprises a particulate polymer having a surface acid amount S of 0.05 mmol/g or more and 0.50 mmol/g or less, a sulfosuccinic acid ester and/or a salt thereof, and water wherein a ratio L/S which is a ratio of an acid amount L in a liquid phase to the surface acid amount S is 0.1 or more and 0.2 or less, it is possible to improve the slurry stability at high shear rates of a slurry composition for porous membranes which comprises the binder composition. It is also possible to limit increases in the water content of a porous membrane formed using the binder composition.

In the disclosed binder composition for non-aqueous secondary battery porous membranes, it is preferred that the acid amount L in the liquid phase of the binder composition is 0.01 mmol/g or more and 0.10 mmol/g or less. When the acid amount L in the liquid phase of the binder composition is 0.01 mmol/g or more, it is possible to increase the slurry stability at high shear rates of a slurry composition for porous membranes. When the acid amount L in the liquid phase of the binder composition is 0.10 mmol/g or less, it is possible to form a porous membrane having a reduced water content.

In the disclosed binder composition for non-aqueous secondary battery porous membranes, it is preferred that the particulate polymer comprises 90% by mass or more and 96% by mass or less of a (meth)acrylic acid alkyl ester monomer unit whose alkyl group has 1 or more and 4 or less carbon atoms. When the proportion of the (meth)acrylic acid alkyl ester monomer unit whose alkyl group has 1 or more and 4 or less carbon atoms is 90% by mass or more, it is possible to improve the heat shrinkage resistance of the resulting porous membrane. On the other hand, when the proportion of the (meth)acrylic acid alkyl ester monomer unit whose alkyl group has 1 or more and 4 or less carbon atoms is 96% by mass or less, it is possible to improve cycle characteristics of the resulting secondary battery.

In the disclosed binder composition for non-aqueous secondary battery porous membranes, it is preferred that the total amount of the sulfosuccinic acid ester and a salt thereof is 0.5 parts by mass or more and 3 parts by mass or less per 100 parts by mass of the particulate polymer. When the total amount of the sulfosuccinic acid ester and a salt thereof is 0.5 parts by mass or more per 100 parts by mass of the particulate polymer, it is possible to increase the slurry stability at high shear rates of a slurry composition for porous membranes. When the total amount of the sulfosuccinic acid ester and a salt thereof is 3.0 parts by mass or less per 100 parts by mass of the particulate polymer, it is possible to form a porous membrane having a reduced water content.

In the disclosed binder composition for non-aqueous secondary battery porous membranes, it is preferred that a tetrahydrofuran (THF)-insoluble content of the particulate polymer is 90% by mass or more. When the tetrahydrofuran (THF)-insoluble content of the particulate polymer is 90% by mass or more, it is possible to improve cycle characteristics of the resulting secondary battery.

The disclosed slurry composition for non-aqueous secondary battery porous membranes comprises any of the binder compositions for non-aqueous secondary battery porous membranes described above, and non-conductive particles. When a slurry composition which comprises any of the binder compositions for non-aqueous secondary battery porous membranes described above and non-conductive particles is used, it is possible to obtain a porous membrane having a reduced water content. Further, a slurry composition which comprises any of the binder compositions for non-aqueous secondary battery porous membranes described above has excellent slurry stability at high shear rates and therefore does not likely to undergo aggregation during formation of a porous membrane.

The disclosed porous membrane for non-aqueous secondary batteries is formed from the slurry composition for non-aqueous secondary battery porous membranes described above. The porous membrane has a reduced water content.

The disclosed non-aqueous secondary battery comprises a positive electrode, a negative electrode, a separator, and an electrolyte solution, wherein at least one battery member selected from the group consisting of the positive electrode, the negative electrode, and the separator comprises the porous membrane for non-aqueous secondary batteries described above. The non-aqueous secondary battery has high performance, with a low water content in the porous membrane.

Advantageous Effect

According to the present disclosure, it is possible to provide a binder composition for non-aqueous secondary battery porous membranes which can increase the slurry stability at high shear rates of a slurry composition for porous membranes and which can form a porous membrane having a reduced water content.

According to the present disclosure, it is also possible to provide a slurry composition for non-aqueous secondary battery porous membranes which has excellent slurry stability at high shear rates and which can form a porous membrane having a reduced water content.

According to the present disclosure, it is also possible to provide a porous membrane for non-aqueous secondary batteries which has a reduced water content, and a non-aqueous secondary battery having the porous membrane.

DETAILED DESCRIPTION

Embodiments of the present disclosure will be described in detail below.

The disclosed binder composition for non-aqueous secondary battery porous membranes is used as a material used when preparing a slurry composition for non-aqueous secondary battery porous membranes. The disclosed slurry composition for non-aqueous secondary battery porous membranes is prepared using the disclosed binder composition for non-aqueous secondary battery porous membranes. The disclosed porous membrane for non-aqueous secondary batteries is formed using the disclosed slurry composition for non-aqueous secondary battery porous membranes. In addition, the disclosed non-aqueous secondary battery comprises the disclosed porous membrane for non-aqueous secondary batteries on at least one battery member.

(Binder Composition for Non-Aqueous Secondary Battery Porous Membranes)

The disclosed binder composition for porous membranes comprises a particulate polymer having a binding ability, sulfosuccinic acid ester and/or a salt thereof, and water, and may optionally further comprise other component(s). The disclosed binder composition for porous membranes may also comprise small amounts of organic solvent and/or the like.

The particulate polymer at least has the following feature: the surface acid amount S per gram of the particulate polymer is 0.05 mmol/g or more and 0.50 mmol/g or less.

Further, the binder composition for porous membranes has the following feature: a ratio L/S which is the ratio of an acid amount L in a liquid phase of the binder composition to the surface acid amount S is 0.1 or more and 0.2 or less.

Slurry compositions which comprise the disclosed binder composition for non-aqueous secondary battery porous membranes have excellent slurry stability at high shear rates. Porous membranes formed using the disclosed binder composition for porous membranes have a reduced water content. Further, porous membranes formed using the disclosed binder composition for porous membranes have excellent heat shrinkage resistance. Thus, when the disclosed binder composition for porous membranes is used, it is possible to obtain a secondary battery having excellent cycle characteristics.

The following provides detailed descriptions of "a particulate polymer" and "a sulfosuccinic acid ester and/or a salt thereof" contained in the disclosed binder composition for non-aqueous secondary battery porous membranes.

<Particulate Polymer>

The particulate polymer ensures the strength of the resulting porous membrane and holds together the components contained in the porous membrane to prevent their detachment from the porous membrane.

Usually, the particulate polymer is not a water-soluble polymer but is present in the form of particles in an aqueous medium.

Polymers used to constitute the particulate polymer are not particularly limited and examples thereof include conjugated diene polymers, acrylic polymers, fluorine-containing polymers, silicone polymers, and other known polymers. In particular, it is preferred that the particulate polymer comprises a (meth)acrylic acid alkyl ester monomer unit, and more preferably further comprises an acidic group-containing monomer unit and/or other monomer unit(s).

It is preferred that the particulate polymer has a tetrahydrofuran (THF)-insoluble content of 90% by mass or more.

The phrase "comprise a monomer unit" and other equivalent phrases as used herein mean that "a structure unit derived from a monomer is contained in a polymer obtained using that monomer." The term "(meth)acrylic" as used herein means acrylic and/or methacrylic.

[(Meth)Acrylic Acid Alkyl Ester Monomer Unit]

Examples of (meth)acrylic acid alkyl ester monomers which may form a (meth)acrylic acid alkyl ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate. From the viewpoint of affinity with electrolyte solutions, preferred (meth)acrylic acid alkyl ester monomers are (meth)acrylic acid alky esters whose alkyl group bound to the non-carbonyl oxygen atom has 1 to 4 carbon atoms (e.g., methyl acrylate (MA), ethyl acrylate (EA), n-propyl acrylate, and n-butyl acrylate (BA)), with methyl acrylate (MA), ethyl acrylate (EA) and n-butyl acrylate (BA) being more preferred, and n-butyl acrylate (BA) being even more preferred. From the viewpoint of reducing the amount of water the particulate polymer brings into the secondary battery to thereby limit the decomposition of the electrolyte in the electrolyte solution for improved electrical characteristics (especially, cycle characteristics) of the secondary battery, it is preferred that (meth)acrylic acid alkyl ester monomers do not have a hydrophilic group such as an acidic group (e.g., carboxylic acid group, sulfo group, phosphate group, or hydroxyl group).

These (meth)acrylic acid alkyl ester monomers may be used singly or in combination of two or more kinds.

The proportion of the (meth)acrylic acid alkyl ester monomer unit in the particulate polymer is preferably 90% by mass or more, more preferably 92.2% by mass or more, even more preferably 92.8% by mass or more, and particularly preferably 93% by mass or more, but preferably 96% by mass or less, more preferably 95.5% by mass or less, even more preferably 95.3% by mass or less, still even more preferably 95% by mass or less, particularly preferably 94.5% by mass or less, and most preferably 94% by mass or less. When the proportion of the (meth)acrylic acid alkyl ester monomer unit is 90% by mass or more, it is possible to improve the heat shrinkage resistance of the resulting porous membrane. On the other hand, when the proportion of the (meth)acrylic acid alkyl ester monomer unit is 96% by mass or less, it is possible to improve cycle characteristics (life characteristics) of the resulting secondary battery.

[Acidic Group-Containing Monomer Unit]

Examples of acidic group containing monomers which may form an acidic group-containing monomer unit include carboxylic acid group-containing monomers, sulfo group-containing monomers, and phosphate group-containing monomers.

Examples of carboxylic acid group-containing monomers include ethylenically unsaturated monocarboxylic acids and derivatives thereof, ethylenically unsaturated dicarboxylic acids and acid anhydrides thereof, and derivatives thereof.

Examples of ethylenically unsaturated monocarboxylic acids include acrylic acid (AA), methacrylic acid (MAA), and crotonic acid. Examples of derivatives of ethylenically unsaturated monocarboxylic acids include 2-ethyl acrylic acid, isocrotonic acid, α-acetoxy acrylic acid, β-trans-aryloxy acrylic acid, α-chloro-β-E-methoxy acrylic acid, and β-diaminoacrylic acid.

Examples of ethylenically unsaturated dicarboxylic acids include maleic acid, fumaric acid, and itaconic acid (IA). Examples of acid anhydrides of ethylenically unsaturated dicarboxylic acids include maleic anhydride, acrylic anhydride, methyl maleic anhydride, and dimethyl maleic anhydride. Examples of derivatives of ethylenically unsaturated dicarboxylic acids include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleate.

Examples of sulfo group-containing monomers include vinyl sulfonic acid, methyl vinyl sulfonic acid, (meth)allyl sulfonic acid, (meth)acrylic acid 2-sulfoethyl, 2-acrylamide-2-methyl propane sulfonic acid, and 3-allyloxy-2-hydroxy-propane sulfonic acid.

The term "(meth) allyl" as used herein means allyl and/or methallyl.

Examples of phosphate-group containing monomers include 2-(meth)acryloyl oxy ethyl phosphate, methyl-2-(meth)acryloyloxyethyl phosphate, and ethyl-(meth)acryloyloxyethyl phosphate.

The term "(meth)acryloyl" as used herein means acryloyl and/or methacryloyl.

Among these acidic group-containing monomers, carboxylic acid group-containing monomers are preferred, with ethylenically unsaturated monocarboxylic acids being more preferred, and acrylic acid (AA) and methacrylic acid (MAA) being even more preferred.

The proportion of the acidic group-containing monomer unit in the particulate polymer is preferably 0.1% by mass or more, more preferably 0.4% by mass or more, even more preferably 0.7% by mass or more. still even more preferably 1.0% by mass or more, and particularly preferably 1.5% by mass or more, but preferably 3% by mass or less, more preferably 2.6% by mass or less, particularly preferably 2.2% by mass or less, and most preferably 2.0% by mass or less. When the proportion of the acidic group-containing monomer unit is 0.1% by mass or more, it is possible to increase the slurry stability at high shear rates of a slurry composition for porous membranes. When the proportion of the acidic group-containing monomer unit is 3% by mass or less, it is possible to form a porous membrane having a reduced water content.

[Other Monomer Units]

The particulate polymer may comprise monomer unit(s) other than the (meth)acrylic acid alkyl ester monomer unit and the acidic group-containing monomer unit described above. Such other monomer units are not particularly limited and examples thereof include cross-linkable monomer units and (meth)acrylonitrile monomer units.

As described above, because cross-linkable monomer units are monomer units other than the (meth)acrylic acid alkyl ester monomer unit and the acidic group-containing monomer unit, cross-linkable monomers which may form cross-linkable monomer units do not encompass the (meth) acrylic acid alkyl ester monomers and the acidic group-containing monomers described above.

[[Cross-Linkable Monomer Units]]

As cross-linkable monomers which may form cross-linkable monomer units, monomers which may form a cross-linked structure when polymerized can be used. Specific examples include monofunctional monomers having a thermally cross-linkable group and one ethylenic double bond per molecule, and polyfunctional monomers having two or more ethylenic double bonds per molecule. Examples of thermally cross-linkable groups of monofunctional monomers include epoxy group, N-methylolamide group, oxetanyl group, oxazoline group, and combinations thereof. With a cross-linkable monomer unit being included, it is possible to increase the THF-insoluble content for improved cycle characteristics of the resulting secondary battery.

The cross-linkable monomers may be hydrophobic or hydrophilic.

The term "hydrophobic" as used herein with regard to cross-linkable monomers means that cross-linkable monomers do not have a hydrophilic group, and the term "hydrophilic" as used herein with regard to cross-linkable monomers mean that cross-linkable monomers have a hydrophilic group. The "hydrophilic group" of cross-linkable monomers refers to carboxylic acid group, hydroxyl group, sulfo group, phosphate group, epoxy group, thiol group, aldehyde group, amide group, oxetanyl group, or oxazoline group.

Examples of hydrophobic cross-linkable monomers (hydrophobic cross-linkers) include polyfunctional (meth)acrylates such as allyl (meth)acrylates (e.g., AMA), ethylene di(meth)acrylate, diethylene glycol di(meth)acrylate, triethylene glycol di(meth)acrylate, tetraethylene glycol di(meth) acrylate, and trimethylol propane-tri(meth)acrylate; polyfunctional allyl/vinyl ethers such as dipropylene glycol diallyl ether, polyglycol diallyl ether, triethylene glycol divinyl ether, hydroquinone diallyl ether, and tetraallyloxyethane; and divinylbenzene.

Examples of hydrophilic cross-linkable monomers (hydrophilic cross-linkers) include vinyl glycidyl ether, allyl glycidyl ether (AGE), methylol acrylamide, and acrylamide.

The term "(meth)acrylate" as used herein means acrylate and/or methacrylate.

These cross-linkable monomers can be used singly or in combination of two or more kinds.

The proportion of the cross-linkable monomer unit in the particulate polymer is preferably 0.01% by mass or more, more preferably 0.1% by mass or more, and particularly preferably 0.5% by mass or more, but preferably 5% by mass or less, more preferably 4% by mass or less, and particularly preferably 3% by mass or less. When the proportion of the cross-linkable monomer unit is 0.01% by mass or more, it is possible to increase the THF-insoluble content for improved cycle characteristics of the resulting secondary battery. On the other hand, when the proportion of the cross-linkable monomer unit is 5% by mass or less, the particulate polymer can exert good binding capacity.

[Preparation of Particulate Polymer]

The particulate polymer is prepared by polymerizing a monomer composition containing the monomer(s) described above.

The proportion of each monomer in the monomer composition is usually adjusted such that it is the same as the proportion of the corresponding monomer unit in a desired particulate polymer to be obtained.

Any mode of polymerization can be used; for example, solution polymerization, suspension polymerization, bulk polymerization, emulsion polymerization or other any polymerization method can be used. As the polymerization reaction, addition polymerization such as ionic polymerization, radical polymerization or living radical polymerization can be used. Emulsifiers, dispersants, polymerization initiators, polymerization promoters and other agents commonly used for polymerization can be used in amounts commonly used in the art.

[Properties of Particulate Polymer]

Particulate polymers used in the present disclosure are preferably random copolymers. The properties of particulate polymers, including those of random copolymers, will be described in detail below.

[[Surface Acid Amount S]]

The "surface acid amount S of the particulate polymer" herein refers to a surface acid amount per g of the particulate polymer contained in the binder composition, and can be measured using the measurement method described in Examples herein.

The surface acid amount S of the particulate polymer is 0.05 mmol/g or more and 0.50 mmol/g or less. The surface acid amount S of the particulate polymer is preferably 0.08 mmol/g or more, more preferably 0.10 mmol/g or more, even more preferably 0.19 mmol/g or more, and particularly preferably 0.25 mmol/g or more, but preferably 0.45 mmol/g or less, and more preferably 0.40 mmol/g or less. When the surface acid amount S is 0.05 mmol/g or more, it is possible to increase the slurry stability at high shear rates of a slurry composition for porous membranes. When the surface acid amount S is 0.50 mmol/g or less, it is possible to form a porous membrane having a reduced water content. The surface acid amount S can be adjusted by changing the type and amount of the acidic group-containing monomer used when preparing the particulate polymer and/or the particle diameter of the particulate polymer.

Because the disclosed binder composition comprises a sulfosuccinic acid ester, even if the amount of the acidic group-containing monomer used for preparation of the particulate polymer is small, the surface acid amount S can be sufficiently increased, although the mechanism of this is unclear. Thus, the slurry stability can be enhanced while limiting increases in water contents in the porous membrane.

[[Tetrahydrofuran (THF)-Insoluble Content]]

The "THF-insoluble content" of the particulate polymer herein can be measured by the measurement method described in Examples herein. The particulate polymer preferably has a tetrahydrofuran (THF)-insoluble content of 90% by mass or more, more preferably 91% by mass or more, and particularly preferably 92% by mass or more. When the tetrahydrofuran (THF)-insoluble content of the particulate polymer is 90% by mass or more, it is possible to improve cycle characteristics of the resulting secondary battery.

<Sulfosuccinic Acid Ester and Salt Thereof>

Examples of sulfosuccinic acid esters and salts thereof include dialkyl sulfosuccinates or salts thereof, and monoalkyl sulfosuccinates or salts thereof. The alkyl groups of the dialkyl sulfosuccinates and monoalkyl sulfosuccinates may be linear, branched or alicyclic alkyl groups.

Examples of dialkyl sulfosuccinates or salts thereof include dioctyl sulfosuccinate, dicyclohexyl sulfosuccinate, ditridecyl sulfosuccinate, diamyl sulfosuccinate, and diisobutyl sulfosuccinate, or sodium salts thereof.

Examples of monoalkyl sulfosuccinates or salts thereof include octyl sulfosuccinate and cyclohexyl sulfosuccinate, or sodium salts thereof.

Preferred is sodium dioctyl sulfosuccinate for its excellent biodegradability in view of wastewater treatment etc. at the time of preparation of the particulate polymer or slurry composition.

The total amount of the sulfosuccinic acid ester and the salt thereof is preferably 0.5 parts by mass or more, and more preferably 0.8 parts by mass or more, but preferably 3.0 parts by mass or less, and more preferably 2.0 parts by mass or less, per 100 parts by mass of the particle polymer. When the total amount of the sulfosuccinic acid ester and the salt thereof is 0.5 parts by mass or more, the slurry stability at high shear rates of a slurry composition for porous membranes can be enhanced. When the total amount of the sulfosuccinic acid ester and the salt thereof is 3.0 parts by mass or less, it is possible to form a porous membrane having a reduced water content.

<Acid Amount L in Liquid Phase in Binder Composition>

"The acid amount L in the liquid phase of the binder composition" herein refers to an acid amount in the liquid phase per g of solids contained in the binder composition which comprises a particulate polymer and sulfosuccinic acid ester and/or a salt thereof, and can be measured using the measurement method described in Examples herein.

The acid amount L in the liquid phase of the binder composition is preferably 0.01 mmol/g or more, more preferably 0.013 mmol/g or more, even more preferably 0.02 mmol/g or more, still even more preferably 0.021 mmol/g or more, particularly preferably 0.03 mmol/g or more, and most preferably 0.037 mmol/g or more, but preferably 0.10 mmol/g or less, more preferably 0.072 mmol/g or less, even more preferably 0.07 mmol/g or less, still even more preferably 0.049 mmol/g or less, particularly preferably 0.045 mmol/g or less, and most preferably 0.042 mmol/g or less. When the acid amount L in the liquid phase of the binder composition is 0.01 mmol/g or more, it is possible to increase the slurry stability at high shear rates of a slurry composition for porous membranes. When the acid amount L in the liquid phase of the binder composition is 0.10 mmol/g or less, it is possible to form a porous membrane having a reduced water content. The acid amount L in the liquid phase can be adjusted by the type and amount of the acidic group-containing monomer used when preparing the particulate polymer, the amount of the particulate polymer blended, and the amount of sulfosuccinic acid ester and/or a salt thereof blended.

<Ratio L/S>

The ratio L/S which is the ratio of acid amount L to surface acid S is 0.1 or more and 0.2 or less. The ratio L/S is preferably 0.111 or more, more preferably 0.13 or more, even more preferably 0.160 or more, particularly preferably 0.163 or more, most preferably 0.168 or more, but preferably 0.196 or less, more preferably 0.195 or less, and particularly preferably 0.185 or more. When the ratio L/S is 0.1 or more, it is possible to increase the slurry stability at high shear rates of a slurry composition for porous membranes. When the ratio L/S is 0.2 or less, it is possible to form a porous membrane having a reduced water content.

<Preparation of Binder Composition for Non-Aqueous Secondary Battery Porous Membrane>

Methods of preparing the binder composition for porous membranes are not specifically limited. For example, when the preparation of the particulate polymer is carried out in an aqueous medium to prepare an aqueous dispersion of the particulate polymer, a mixture of the aqueous dispersion and sulfosuccinic acid ester may be used as the binder composition. Alternatively, optional other component(s) may be added to the mixture of the aqueous dispersion and sulfosuccinic acid ester for use as the binder composition.

Examples of such other components include those described in the section titled "Slurry Composition for Non-Aqueous Secondary Battery Porous Membrane" below.

(Slurry Composition for Non-Aqueous Secondary Battery Porous Membrane)

The disclosed slurry composition for non-aqueous secondary battery porous membranes is an aqueous slurry composition in which a particulate polymer and a sulfosuccinic acid ester and/or a salt thereof, derived from the binder composition for porous membranes described above, and non-conductive particles are dispersed in water that serves as a dispersion medium.

The porous membrane formed using the disclosed slurry composition for porous membranes has a reduced water content. Also, the porous membrane has excellent heat shrinkage resistance.

<Non-Conductive Particles>

Non-conductive particles are particles which are not electrically conductive and which dissolve neither in water used as the dispersion medium in the slurry composition nor in a non-aqueous electrolyte solution in a secondary battery and thus retain their shape even in the water or in the non-aqueous electrolyte solution. Because non-conductive particles are also electrochemically stable, they are present stably in the porous membrane in the use environment of secondary batteries. When the slurry composition for porous membranes comprises non-conductive particles, the network structure of the resulting porous membrane is appropriately plugged up, whereby lithium dendrites and the like are prevented from passing through the porous membrane and a short-circuit between the electrodes can be prevented more reliably. As such non-conductive particles, it is possible to use, for example, various inorganic particles and organic particles.

Examples of inorganic particles include particles of oxides such as aluminum oxide (alumina), silicon oxide, magnesium oxide, titanium oxide, $BaTiO_2$, ZrO, and alumina-silica composite oxide; particles of nitrides such as aluminum nitride and boron nitride; particles of covalent crystals such as silicon and diamond; particles of hardly-soluble ionic crystals such as barium sulfate, calcium fluoride and barium fluoride; and microparticles of clays such as talc and montmorillonite.

Examples of organic particles include particles of various cross-linked polymers such as polyethylene, polystyrene, polydivinylbenzene, cross-linked products of styrene-divinylbenzene copolymers, polyimide, polyamide, polyamide-imide, melamine resins, phenol resins, and benzoguanamine-formaldehyde condensates; and particles of heat resistant polymers such as polysulfone, polyacrylonitrile, polyaramid, polyacetal, and thermoplastic polyimide. The organic particles and the particulate polymer described above are different in that the particulate polymer has a binding ability while the organic particles do not have a binding ability.

From the viewpoint of improving the durability of the porous membrane and electrical characteristics of a secondary battery having the porous membrane, inorganic particles are preferred as such non-conductive particles, and aluminum oxide particles are more preferred.

The particle size of the non-conductive particles is not particularly limited and can be the same as that of the non-conductive particles conventionally used.

<Blending Ratio of Non-Conductive Particles and Binder Composition for Porous Membrane>

The blending ratio of the non-conductive particles and the binder composition for porous membranes in the slurry composition for porous membranes is not particularly limited. For example, the slurry composition comprises the binder composition such that the blending amount of the particulate polymer is preferably 0.1 parts by mass or more, more preferably 1 part by mass or more, and particularly preferably 3 parts by mass or more, but preferably 25 parts by mass or less, more preferably 20 parts by mass or less, even more preferably 18 parts by mass or less, and particularly preferably 15 parts by mass or less, per 100 parts by mass of the non-conductive particles. When the blending amount of the particulate polymer is 0.1 parts by mass or more per 100 parts by mass of the non-conductive particles, adhesion between the porous membrane and the battery member is ensured and also the heat shrinkage resistance of the porous membrane can be improved. When the blending amount of the particulate polymer is 25 parts by mass or less per 100 parts by mass of the non-conductive particles, it is possible to improve electrical characteristics of a secondary battery by reducing the amount of water the particulate polymer brings into the secondary battery, and also to improve the slurry stability at high shear rates of the slurry composition.

<Other Components>

The slurry composition for porous membranes may comprise other optional component(s) in addition to the components described above. Optional components are not particularly limited as long as they do not excessively adversely affect the battery reaction in the secondary battery comprising the porous membrane. Such optional components may be singly or in combination of two or more kinds.

Examples of optional components include wetting agents, leveling agents, electrolyte decomposition inhibitors, and water-soluble polymers.

[Water-Soluble Polymers]

Among other components described above, the slurry composition for porous membranes preferably comprises a water-soluble polymer. When the slurry composition, which is an aqueous slurry composition, comprises a water-soluble polymer, the slurry composition can be thickened such that it has a viscosity that allows for easy application of the slurry composition. In addition, because water-soluble polymers have binding ability and electrolyte solution resistance, they can play a role in assisting the binding of components within the porous membrane by means of the particulate polymer and the adhesion between the porous membrane and the battery member in the secondary battery. Accordingly, it is possible to improve the durability of the porous membrane with the use of water-soluble polymers.

The term "water-soluble" as used herein with regard to a certain substance means that an insoluble content is less than 1.0% by mass when 0.5 g of the substance has been dissolved in 100 g of water at 25° C. As to a substance whose solubility changes depending on the pH of water, the substance is deemed to be "water-soluble" as long as it meets the definition of "water-soluble" described above for at least one pH value.

Examples of water-soluble polymers include natural polymer compounds, semi-synthetic polymer compounds, and synthetic polymer compounds.

[[Natural Polymer Compounds]]

Examples of natural polymer compounds include polysaccharides and proteins derived from plants and animals, and such polysaccharides and proteins that have been subjected to fermentation treatment by microorganisms or the like, or treatment by heat.

These natural polymer compounds can be classified as plant-based natural polymer compounds, animal-based natural polymer compounds, microorganism-produced natural polymer compounds, and so forth.

Examples of plant-based natural polymer compounds include gum arabic, gum tragacanth, galactan, guar gum, carob gum, karaya gum, carrageenan, pectin, kannan, quince seed (marmelo), algal colloid (phaeophyceae extract), starch (e.g., starch derived from rice, corn, potato, or wheat), and glycyrrhizin. Examples of animal-based natural polymer compounds include collagen, casein, albumin, and gelatin. Examples of microorganism-produced natural polymers include xanthan gum, dextran, succinoglucan, and pullulan.

[[Semi-Synthetic Polymer Compounds]]

Examples of semi-synthetic polymer compounds include cellulosic semi-synthetic polymer compounds. Cellulosic semi-synthetic polymer compounds can be classified as non-ionic, anionic, and cationic.

Examples of non-ionic cellulosic semi-synthetic polymer compounds include alkyl celluloses such as methyl cellulose, methyl ethyl cellulose, ethyl cellulose, and microcrystalline cellulose; and hydroxyalkyl celluloses such as hydroxyethyl cellulose, hydroxybutyl methylcellulose, hydroxypropyl cellulose, hydroxypropyl methylcellulose, hydroxyethyl methylcellulose, hydroxypropyl methylcellulose stearoxy ether, carboxymethyl hydroxyethyl cellulose, alkyl hydroxyethyl cellulose, and nonoxynyl hydroxyethyl cellulose.

Examples of anionic cellulosic semi-synthetic polymer compounds include substitution products obtained by substitution of the non-ionic cellulosic semi-synthetic polymer compounds described above with various derivative groups and salts (e.g., sodium salts, ammonium salts) of these substitution products. Specific examples include sodium cellulose sulfate, methyl cellulose, methyl ethyl cellulose, ethyl cellulose, carboxymethyl cellulose (CMC), and salts thereof.

Examples of cationic cellulosic semi-synthetic polymer compounds include low nitrogen hydroxyethyl cellulose dimethyldiallyl ammonium chloride (polyquaternium-4), O-[2-hydroxy-3-(trimethylammonio)propyl]hydroxyethyl cellulose chloride (polyquaternium-10), and O-[2-hydroxy-3-(lauryldimethylammonio)propyl]hydroxy ethyl cellulose chloride (polyquaternium-24).

[[Synthetic Polymer Compounds]]

Examples of synthetic polymer compounds include polyacrylates such as sodium polyacrylate, polyvinyl alcohol, polyethylene oxide, polyvinyl pyrrolidone, and copolymers of acrylic acid or acrylates with vinyl alcohols, completely or partially saponified copolymers of maleic anhydride or maleic or fumaric acid and vinyl acetate, modified polyvinyl alcohols, modified polyacrylic acids, polyethylene glycols, polycarboxylic acids, ethylene-vinyl alcohol copolymers, vinyl acetate polymers, and acrylamide polymers having a carboxylic acid group and/or a cyano group introduced.

From the viewpoint of imparting heat resistance to the porous membrane to limit heat shrinkage of an organic separator such as a polypropylene separator, among such water-soluble polymers, carboxymethyl cellulose and salts thereof, and acrylamide polymers having a carboxylic acid group introduced are preferred. Furthermore, from the viewpoint of reducing the amount of water brought in the secondary battery for improved electrical characteristics, acrylamide polymers having a carboxylic acid group introduced are particularly preferred.

The amount of the water-soluble polymer blended in the slurry composition for porous membranes is preferably 0.1 parts by mass or more, and more preferably 0.5 parts by mass or more, but preferably 10 parts by mass or less, and more preferably 5 parts by mass or less, per 100 parts by mass of the non-conductive particles. When the amount of the water-soluble polymer is within the above range, an appropriate viscosity can be imparted to the slurry composition, and also the durability of the resulting porous membrane can be improved.

<Preparation of Slurry Composition for Non-Aqueous Secondary Battery Porous Membrane>

Methods of preparing the slurry composition for porous membranes are not particularly limited and the slurry composition can be obtained by mixing together the binder composition for porous membranes, the non-conductive particles, and the optional component(s) added as needed. Any method can be used for mixing. For efficient mixing of the components, mixing is performed using a dispersing device as a mixing device.

The dispersing device is preferably capable of uniformly dispersing and mixing the components described above. Examples of dispersing devices include ball mill, sand mill, pigment disperser, grinding machine, ultrasonic disperser, homogenizer, and planetary mixer. For their ability to apply a high dispersing shear force, high-dispersing devices such as bead mill, roll mill, and FILMIX are particularly preferred.

Usually, the solid content concentration of the slurry composition for porous membranes may be arbitrarily determined such that the slurry composition has a viscosity that does not compromise the operation when producing a porous membrane. Specifically, the solid content concentration of the slurry composition can be usually 10% by mass to 50% by mass.

(Porous Membrane for Non-Aqueous Secondary Battery)

A porous membrane for non-aqueous secondary batteries can be formed on a substrate for example by applying the slurry composition for non-aqueous secondary battery porous membranes described above onto a surface of an appropriate substrate to form thereon a coating film, and drying the coating film formed. This porous membrane comprises the particulate polymer and sulfosuccinic acid ester and/or a salt thereof and the non-conductive particles, and has a reduced water content and excellent heat shrinkage resistance. A non-aqueous secondary battery which comprises the porous membrane has excellent battery characteristics.

The substrate onto which the slurry composition for porous membranes is to be applied is a member on which a coating film of the slurry composition is to be formed. The substrate is not particularly limited. For example, a coating film of the slurry composition may be formed on the surface of a release substrate, the coating film may be dried to form a porous membrane, and the release substrate may be peeled off from the porous membrane. The porous membrane thus peeled off from the release substrate can also be used as a self-supporting membrane in a secondary battery.

However, it is preferable to use a battery member as the substrate from the viewpoint of omitting the step of peeling the porous membrane for increased production efficiency. Specific examples of such battery members include separators and electrodes. The porous membranes disposed on separators and electrodes can be suitably used as protective layers for improving the heat resistance, strength and other properties of these battery members.

<Separator>

Separators are not particularly limited and examples thereof include organic separators and other known separators. Organic separators are porous members made of organic material. Examples of organic separators include microporous membranes and non-woven fabrics containing a polyolefin resin such as polyethylene or polypropylene or an aromatic polyamide resin. Preferred are microporous membranes or non-woven fabrics made of polyethylene for their excellent strength. Organic separators can have any thickness, usually 0.5 μm or more, and preferably 5 μm or more, but usually 40 μm or less, preferably 30 μm or less, and more preferably 20 μm or less.

[Electrodes]

Electrodes (positive and negative electrodes) are not particularly limited and examples thereof include electrodes having electrode mixed material layers on current collectors.

Current collectors, electrode active materials (positive and negative electrode active materials) and binders for electrode mixed material layers (binders for positive and negative electrode mixed material layers) in electrode mixed material layers, and methods of forming electrode mixed material layers on current collectors can be chosen from those known in the art; for example, those described in JP2013-145763A can be used.

[Method of Forming Porous Membrane for Non-Aqueous Secondary Battery]

Examples of methods of forming a porous membrane on a battery member such as the separator or electrode described above include:

1) a method in which the slurry composition for porous membranes is applied on a surface of the battery member (surface on the electrode mixed material layer side in the case of an electrode; the same shall apply hereinafter) and dried;

2) a method in which the battery member is immersed in the slurry composition and dried; and 3) a method in which the slurry composition is applied on a releasable substrate and dried to form thereon a porous membrane, and the porous membrane is transferred to a surface of the battery member.

Preferred is the method 1) because of easiness of controlling the thickness of the porous membrane. More specifically, the method 1) includes applying the slurry composition on the battery member (coating step) and forming a porous membrane by drying the slurry composition applied onto the battery member (porous membrane forming step).

In the coating step, methods of applying the slurry composition for porous membranes on the battery member are not particularly limited. Examples include doctor blade coating, reverse roll coating, direct roll coating, gravure coating, extrusion coating, and brush coating, with gravure coating being preferred because a uniform porous membrane can be obtained.

In the porous membrane forming step, any drying method known in the art can be used to dry the slurry composition on the substrate. Examples of drying methods include drying by warm, hot or low-humidity air, vacuum drying, and drying by irradiation with infrared rays or electron beams. The drying conditions are not particularly limited. The drying temperature is preferably 50° C. to 150° C. and the drying time is preferably 5 to 30 minutes.

The positive electrode, the negative electrode, and the separator may include components other than the battery members and the above-described disclosed porous membrane as long as the effects of the present disclosure are not significantly compromised. For example, other layer(s) may be provided between the battery member and the disclosed porous membrane as needed. In this case, the disclosed porous membrane is indirectly provided on the surface of the battery member. In addition, other layer(s) may be further provided on the surface of the disclosed porous membrane.

The thickness of the porous membrane formed on the substrate is preferably 0.01 µm or more, more preferably 0.1 µm or more, and particularly preferably 1 µm or more, but preferably 20 µm or less, more preferably 10 µm or less, and particularly preferably 5 µm or less. When the thickness of the porous membrane is 0.01 µm or more, it is possible to sufficiently ensure the strength of the porous membrane. When the thickness is 20 µm or less, the diffusibility of the electrolytic solution is ensured, so that output characteristics of the secondary battery which comprises the porous membrane can be increased.

(Non-Aqueous Secondary Battery)

The disclosed non-aqueous secondary battery comprises a positive electrode, a negative electrode, a separator, and an electrolyte solution, wherein at least one battery member selected from the group consisting of the positive electrode, the negative electrode, and the separator comprises the porous membrane for non-aqueous secondary batteries described above, e.g., on the surface of the battery member.

The disclosed non-aqueous secondary battery has high performance because it comprises the porous membrane obtained from the disclosed slurry composition for porous membranes.

<Positive Electrode, Negative Electrode, Separator, and Porous Membrane>

The positive electrode, the negative electrode, the separator, and the porous membrane can be the same as those described in the section titled "Porous Membrane for Non-Aqueous Secondary Battery" and methods of providing the porous membrane on the surface of the positive electrode, negative electrode or separator can use the techniques described their sections.

<Electrolyte Solution>

As the electrolyte solution, typically used is an organic electrolyte solution obtained by dissolving a supporting electrolyte into organic solvent. The supporting electrolyte is, for example, a lithium salt in the case of lithium-ion secondary batteries. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred in that they easily dissolve in solvent and exhibit a high degree of dissociation. These electrolytes may be used alone or in combination or two or more kinds. Normally, the lithium ion conductivity tends to increase as a supporting electrolyte having a higher degree of dissociation is used. Thus, the lithium ion conductivity can be adjusted by the type of the supporting electrolyte used.

Any organic solvent which can dissolve the supporting electrolyte can be used for the electrolyte solution. In the case of lithium-ion secondary batteries, suitable organic solvents include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Alternatively, a mixture of two or more of these solvents may be used. Preferred are carbonates for their high permittivity and a wide stable potential region. Normally, the lithium ion conductivity tends to increase as a solvent having a lower viscosity is used. Thus, the lithium ion conductivity can be adjusted by the type of the solvent used.

The concentration of the electrolyte in the electrolyte solution can be adjusted as appropriate. Further, any additive known in the art can be added to the electrolyte solution.

<Method of Manufacturing Non-Aqueous Secondary Battery>

A non-aqueous secondary battery can be manufactured for example by stacking a positive electrode and a negative electrode with a separator provided therebetween, rolling or folding the resulting laminate as necessary, placing it in a battery container, filling the battery container with an electrolyte solution, and sealing the container. At least one of the positive electrode, the negative electrode, and the separator is configured as a battery member comprising the porous membrane. In order to prevent pressure increase inside the battery and occurrence of overcharging or overdischarging, an overcurrent preventing device such as a fuse or a PTC device; an expanded metal; or a lead plate may be provided as necessary. The battery may have any shape, such as coin, button, sheet, cylindrical, square, or flattened shape.

EXAMPLES

Hereinafter, the present disclosure will be specifically described with reference to Examples. However, the disclosure is not limited to Examples. In the following, "%" and "parts" used to express quantities are by mass, unless otherwise specified.

In Examples and Comparative Examples, "surface acid amount S" and "THF-insoluble content" of particulate polymers, and "acid amount L in the liquid phase" of binder compositions for porous membranes were measured by the methods described below. The heat shrinkage resistance and water content of porous membranes, slurry stability at high shear rates of slurry compositions for porous membranes, and cycle characteristics (life characteristics) of secondary batteries were evaluated by the methods described below.

<Surface Acid Amount S Per g of Particulate Polymer and Acid Amount L (Per g of Solids) in Liquid Phase in Binder Composition for Porous Membrane>

The prepared binder composition is put into a glass container washed with distilled water. A solution conductivity meter is placed and the binder composition is stirred. Stirring is continued until addition of hydrochloric acid described later is completed.

A 0.1N aqueous sodium hydroxide solution is added into the binder composition so that the binder composition has an electrical conductivity of 2.5 to 3.0 mS. After 6 minutes, the electrical conductivity is then measured. The measured value is taken as the electrical conductivity at the start of measurement.

Further, 0.5 mL of 0.1N hydrochloric acid is added into the binder composition and the electrical conductivity is measured after 30 seconds. Thereafter, 0.5 mL of 0.1N hydrochloric acid is added again and the electrical conductivity is measured after 30 seconds. This operation is repeated at 30 second intervals until the electrical conductivity of the binder composition becomes equal to or higher than the electrical conductivity at the start of measurement.

Figure 1:
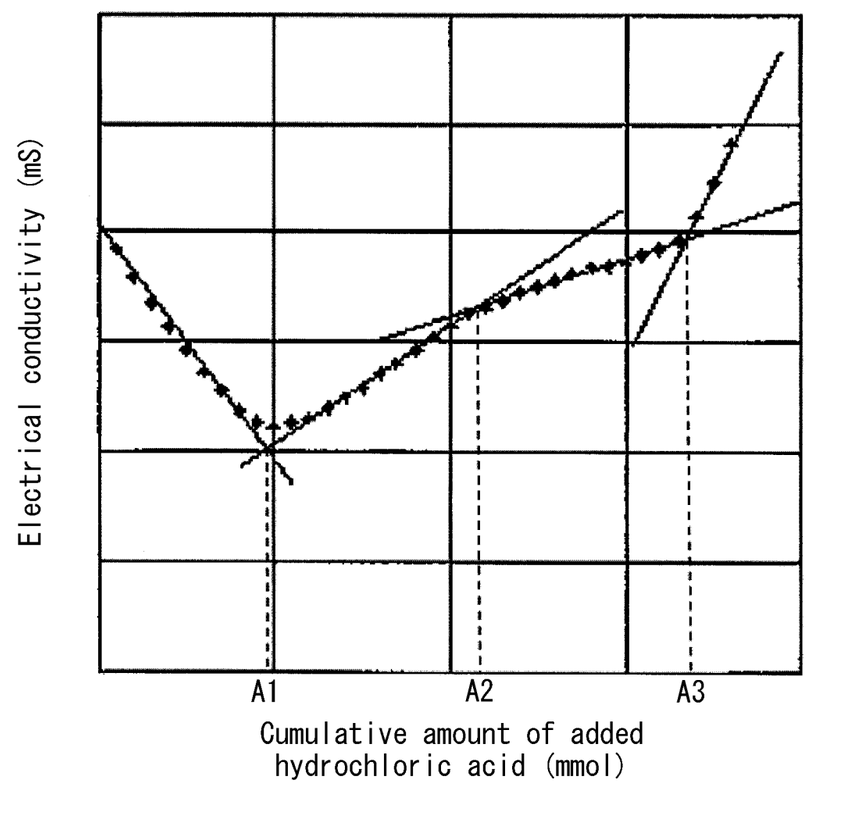
FIG. 1 is a graph showing an added hydrochloric acid amount-electrical conductivity curve which is prepared when calculating the surface acid amount S and the acid amount L.

The obtained electrical conductivity data is plotted on a graph with the electrical conductivity (unit: "mS") on the vertical axis (Y coordinate axis) and the cumulative amount of added hydrochloric acid (unit: "mmol") on the horizontal axis (X coordinate axis). This gives an added hydrochloric acid amount-electrical conductivity curve having three inflection points as illustrated in FIG. 1. The X coordinates of the three inflection points and the X coordinate at the end of the addition of hydrochloric acid are defined as P1, P2, P3, and P4 in order from the smallest value. For the data in the four sections (from zero to the coordinate P1, from the coordinate P1 to the coordinate P2, from the coordinate P2 to the coordinate P3, and from the coordinate P3 to the coordinate P4 on the X coordinate), approximate straight lines L1, L2, L3, and L4 are obtained by the least square method, respectively. The X coordinate of the intersection between the approximate line L1 and the approximate line L2 is defined as A1 (mmol), the X coordinate of the intersection between the approximate line L2 and the approximate line L3 as A2 (mmol), and the X coordinate of the intersection between the approximate line L3 and the approximate line L4 as A3 (mmol).

The surface acid amount S per g of the particulate polymer is given as a value (mmol/g) in terms of hydrochloric acid from the formula (a) given below. The acid amount L (per g of solids) in the liquid phase in the binder composition is given as a value (mmol/g) in terms of hydrochloric acid from the formula (b) given below.

Surface acid amount $S$ per g of particulate polymer= $(A2-A1)$/solids content of particulate polymer in binder composition   Formula(a)

Acid amount $L$ (per g of solids) in liquid phase in binder composition=$(A3-A2)$/solids content in binder composition(solids content including particulate polymer and sulfosuccinic acid ester and/or salt thereof))   Formula(b)

<THF-Insoluble Content of Particulate Polymer>

The prepared binder composition was dried at 25° C. for 48 hours to produce a film having a thickness of 0.2 mm to 0.5 mm. The obtained film was cut into a 1 mm×1 mm square, and the obtained film piece was precisely weighed. The mass of the film piece was taken as W0.

The obtained film piece was immersed in 100 g of tetrahydrofuran (THF) at 60° C. for 24 hours. The film piece pulled up from THF was then vacuum-dried at 105° C. for 3 hours, and the weight W1 of THF-insoluble matter was measured. The THF-insoluble content (% by mass) was calculated using the following formula:

THF-insoluble content=$(W1/W0)\times100\%$

<Slurry Stability at High Shear Rate of Slurry Composition for Porous Membrane>

The slurry composition for porous membranes was applied onto a separator (made of polyethylene) using a gravure roll (number of lines=95) at a conveyance speed of 50 m/min and a gravure rotation ratio of 100%. The coated separator was cut out and the coating amount per unit area M0 (mg/cm$^2$) was calculated. One hour after the start of coating, the coating amount M1 (mg/cm$^2$) was similarly calculated. The coating amount change ΔM (%) was calculated using the equation ΔM=(|M0−M1|/M0×100(%) and evaluated based on the criteria given below. A smaller value of ΔM indicates a higher slurry stability at high shear rates of the slurry composition.

A: Coating amount change ΔM (%) is less than 5%
B: Coating amount change ΔM (%) is 5% or more and less than 10%
C: Coating amount change ΔM (%) is 10% or more and less than 20%
D: Coating amount change ΔM (%) is 20% or more <Water Content of Porous Membrane>

A separator with a porous membrane (thickness=3 μm) was cut into a size of 10 cm×10 cm to prepare a specimen. The specimen was allowed to stand for 24 hours at 25° C. and 50% humidity. Using a coulometric titration moisture meter, the water content W (ppm) of the specimen was measured in accordance with the Karl Fischer method (JIS K-0068 (2001), water vaporization method, vaporization temperature=150° C.). A smaller measured value indicates a lower water content in the porous membrane and hence a smaller amount of water brought into the secondary battery.

A: Water content W is 500 ppm or less
B: Water content W is more than 500 ppm and 600 ppm or less
C: Water content W is more than 600 ppm and 700 ppm or less
D: Water content W is more than 700 ppm <Heat Shrinkage Resistance>

The produced separator with a porous membrane (thickness=3 μm) was cut into a 12 cm×12 cm square. A square image having a side of 10 cm was drawn on the inner side of the porous membrane in the cut-out square piece to prepare a specimen. The specimen was placed in a thermostat chamber having a temperature of 150° C. and left for 1 hour. A change in the area of the square image drawn on the inner side of the porous membrane (={(area of the square image before placing the porous membrane in the thermostat chamber−area of the square image after placing the porous membrane in the thermostat chamber for 1 hour)/(area of the square image before placing the porous membrane in the thermostat chamber)×100%) was determined as a heat shrinkage ratio and evaluated based on the criteria given below. A smaller heat shrinkage ratio indicates a better heat shrinkage resistance of the porous membrane.

A: Heat shrinkage ratio is less than 20%
B: Heat shrinkage ratio is 20% or more and less than 25%
C: Heat shrinkage ratio is 25% or more and less than 30%
D: Heat shrinkage ratio is 30% or more <Cycle Characteristics of Secondary Battery>

For each of 10 secondary batteries, an operation of charging to 4.35V and discharging to 3V by the constant current method at 0.2C in an atmosphere of 25° C. was repeated 100 times (=100 cycles). Electrical capacity was measured for each battery. The average value of the measured electrical capacities of the 10 batteries was taken as a measured value. The ratio of the electrical capacity at the end of 100 cycles to the electrical capacity at the end of 5 cycles was calculated in percentage to find a charge/discharge capacity retention rate. This value was used as an evaluation standard for cycle characteristics and evaluated based on the criteria given below. A higher value of charge/discharge capacity retention rate indicates better cycle characteristics.

A: Charge/discharge capacity retention rate is 80% or more.

B: Charge/discharge capacity retention rate is 70% or more and less than 80%.

C: Charge/discharge capacity retention rate is 60% or more and less than 70%.

D: Charge/discharge capacity retention rate is less than 60%.

Example 1

<Preparation of Particulate Polymer>

A reactor equipped with a stirrer was charged with 70 parts of ion-exchanged water, 0.15 parts of sodium lauryl sulfate (EMAL 2F, manufactured by Kao Chemicals) as an emulsifier and 0.5 parts of ammonium persulfate, the gas phase was purged with nitrogen gas, and the temperature was raised to 60° C.

In another vessel, 50 parts of ion-exchanged water, 0.5 parts of sodium dodecylbenzenesulfonate as a dispersant, (i) 94 parts of n-butyl acrylate (BA) as a (meth)acrylic acid alkyl ester monomer, (ii) 2 parts of methacrylic acid (MAA) as an acidic group-containing monomer, and (iii) 2 parts of acrylonitrile (AN), 1 part of allyl methacryate (AMA) and 1 part of allyl glycidyl ether (AGE) as other monomers were mixed to afford a monomer composition. The monomer composition was continuously added into the reactor over 4 hours to effect polymerization. During addition, the temperature was retained at 60° C. for polymerization reaction. After completion of addition, the reaction mass was stirred for a further 3 hours at 70° C. and then the reaction was terminated. In this way an aqueous dispersion containing a particulate polymer (porous membrane binder) was produced.

The resulting particulate polymer was confirmed to be a random copolymer. The results are shown in Table 1.

<Preparation of Binder Composition for Non-Aqueous Secondary Battery Porous Membrane>

Sodium dioctyl sulfosuccinate as a sulfosuccinic acid ester salt (manufactured by Kishida Chemical Co., Ltd.) was mixed with the aqueous dispersion containing a particulate polymer (porous membrane binder) in an amount of 0.95 parts per 100 parts (in solid content) of the particulate polymer to prepare a binder composition for porous membranes. The acid amount L in the liquid phase of the binder composition was measured. The results are shown in Table 1. In addition, the surface acid amount S per g of the particulate polymer and the THF-insoluble content of the particulate polymer were measured.

<Preparation of Slurry Composition for Non-Aqueous Secondary Battery Porous Membrane>

8 parts (in solid content) of the binder composition containing a particulate polymer, 1.5 parts of an acrylamide polymer having a carboxylic acid group introduced as a water-soluble polymer (Polystron® 117 (Polystron is a registered trademark in Japan, other countries, or both), manufactured by Arakawa Chemical Industries, Ltd.), and 0.2 parts of a polyethylene glycol-based surfactant (SAN NOPCO® SN Wet 366 (SAN NOPCO is a registered trademark in Japan, other countries, or both), manufactured by SAN NOPCO Ltd.) were mixed with 100 parts of alumina filler (LS256, manufactured by Nippon Light Metal Co., Ltd.) as non-conductive particles to prepare a slurry composition for porous membranes.

Using the slurry composition, the slurry stability at high shear rates was evaluated. The results are shown in Table 1.

<Manufacture of Porous Membrane and Separator with Porous Membrane>

An organic separator formed of a polyethylene porous substrate (manufactured by Celgard, LLC, thickness=16 μm) was prepared. The slurry composition obtained as described above was applied onto one side of the organic separator and dried at 60° C. for 10 minutes. In this way a separator having a porous membrane with a thickness of 27 μm (separator with a porous membrane) was obtained.

Using the separator with a porous membrane, the water content and heat shrinkage resistance of the porous membrane were evaluated. The results are shown in Table 1.

<Manufacture of Negative Electrode>

A 5 MPa pressure-resistant vessel equipped with a stirrer was charged with 33 parts of 1,3-butadiene, 3.5 parts of itaconic acid (IA), 63.5 parts of styrene (ST), 0.4 parts of sodium dodecylbenzene sulfonate as an emulsifier, 150 parts of ion-exchanged water, and 0.5 parts of potassium persulfate as a polymerization initiator. After fully stirred, the temperature was raised to 50° C. to initiate polymerization. When the polymer conversion rate reached 96%, the reaction was quenched by cooling to afford a mixture containing a binder (SBR) for negative electrode mixed material layers. The mixture containing the binder was adjusted to pH 8 by the addition of 5% sodium hydroxide aqueous solution, and then unreacted monomers were removed by thermal-vacuum distillation. Thereafter, the mixture was cooled to 30° C. or below to afford an aqueous dispersion containing a desired binder for negative electrode mixed material layers.

Next, 100 parts of synthetic graphite (average particle diameter=15.6 μm) as a negative electrode active material, 1 part (in solid content) of 2% aqueous solution of sodium salt of carboxymethyl cellulose (MAC350HC, manufactured by Nippon Paper Industries Co., Ltd) as a water-soluble polymer, and ion-exchanged water were mixed to a solid content concentration of 68%, and mixed for 60 minutes at 25° C. Subsequently, the solid content concentration was adjusted to 62% by the addition of ion-exchanged, and the mixture was further mixed at 25° C. for 15 minutes. To the mixture obtained were added 1.5 parts (in solid content) of the binder for negative electrode mixed material layers and ion-exchanged water to a final solid content concentration of 52%, and further mixed for 10 minutes. The resultant mixture was subjected to defoaming treatment under reduced pressure to afford a secondary battery negative electrode slurry composition with good fluidity.

The negative electrode slurry composition thus obtained was applied by a comma coater onto a 20 μm-thick copper foil (current collector) to a dry film thickness of on the order of 150 μm, and dried. This drying was performed by transporting the copper foil through an oven at 60° C. at a rate of 0.5 m/min over 2 minutes. After that, the copper foil was heat-treated for 2 minutes at 120° C. Thus, a pre-press web of negative electrode was obtained. The pre-press web of negative electrode was rolled with a roll press to afford a post-press negative electrode in which the thickness of the negative electrode mixed material layer is 80 μm (single-sided negative electrode).

Similar coating was applied on the back side of the pre-press web of negative electrode to form a negative electrode mixed material layer on both sides. The pre-press web was then rolled with a roll press to afford a post-press negative electrode in which the thickness of each negative electrode mixed material layer is 80 μm (double-sided negative electrode).

<Manufacture of Positive Electrode>

100 parts of $LiCoO_2$ having a volume-average particle diameter of 12 μm as a positive electrode active material, 2 parts of acetylene black (HS-100, manufactured by Denka Company Limited) as a conductor, 2 parts (in solid content) of polvinylidene difluoride (#7208, manufactured by KUREHA Corporation) as a binder for positive electrode mixed material layers, and N-methyl pyrrolidone were mixed to a total solid content concentration of 70%. These materials were mixed to prepare a positive electrode slurry composition.

The positive electrode slurry composition thus obtained was applied by a comma coater onto a 20 μm-thick aluminum foil (current collector) to a dry film thickness of on the order of 150 μm, and dried. This drying was performed by transporting the aluminum foil through an oven at 60° C. at a rate of 0.5 m/min over 2 minutes. After that, the aluminum foil was heat-treated for 2 minutes at 120° C. Thus, a web of positive electrode was obtained. The pre-press web of positive electrode was rolled with a roll press to afford a post-press positive electrode in which the thickness of the positive electrode mixed material layer is 80 μm (single-sided positive electrode).

Similar coating was applied on the back side of the pre-press web of positive electrode to form a positive electrode mixed material layer on both sides. The pre-press web was then rolled with a roll press to afford a post-press positive electrode in which the thickness of each positive electrode mixed material layer is 80 μm (double-sided positive electrode).

<Manufacture of Secondary Battery>

The single-sided positive electrode obtained above was cut out into a size of 5 cm×15 cm, and the separator with a porous membrane cut out into a size of 6 cm×16 cm was disposed thereon (on the side mixed material layer side) so that the porous membrane faces the single-sided positive electrode. The double-sided negative electrode cut out into a size of 5.5 cm×15.5 cm was then disposed on the separator to afford a laminate A. On the double-sided negative electrode side of the laminate A, the separator with a porous membrane cut out into a size of 6 cm×16 cm was disposed so that the organic separator faces the double-sided negative electrode. The double-sided positive electrode cut out into a size of 5 cm×15 cm was then placed on the laminate. Next, the separator with a porous membrane cut out into a size of 6 cm×16 cm was disposed on the double-sided positive electrode so that the porous membrane faces the double-sided positive electrode. Finally, the single-sided negative electrode cut out into a size of 5.5 cm×5.5 cm was placed on the separator with a porous membrane so that the negative electrode mixed material layer faces the organic separator of the separator with a porous membrane. In this way a laminate B was obtained. The laminate B was enclosed by an aluminum packaging case as a battery outer package and non-aqueous electrolyte solution (solvent: EC/DEC/VC=68.5/30/1.5 (by volume); electrolyte: 1M $LiPF_6$) was injected so as not to leave air. The aluminum package was closed by heat sealing at 150° C. The obtained battery outer package was flat-pressed at 100° C. for 2 minutes at 100 kgf to manufacture a laminate-type lithium ion secondary battery having a capacity of 1,000 mAh.

Using the obtained secondary battery, cycle characteristics (life characteristics) were evaluated. The results are shown in Table 1.

Example 2

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the particulate polymer, 95.3 parts of n-butyl acrylate (BA) and 0.7 parts of methacrylic acid (MAA) were used instead of using 94 parts of n-butyl acrylate (BA) and 2 parts of methacrylic acid (MAA). The results are shown in Table 1.

Example 3

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the particulate polymer, itaconic acid (IA) was used instead of using methacrylic acid (MAA). The results are shown in Table 1.

Example 4

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the particulate polymer, 95 parts of n-butyl acrylate (BA) and 1 part of methacrylic acid (MAA) were used instead of using 94 parts of n-butyl acrylate (BA) and 2 parts of methacrylic acid (MAA), and that upon preparation of the binder composition, 1.3 parts of sodium dioctyl sulfosuccinate was used instead of using 0.95 parts sodium dioctyl sulfosuccinate. The results are shown in Table 1.

Example 5

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the particulate polymer, acrylic acid (AA) was used instead of using methacrylic acid (MAA). The results are shown in Table 1.

Example 6

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the particulate polymer, 94.5 parts of n-butyl acrylate (BA) and 0.5 parts of allyl methacrylate (AMA) were used instead of using 94 parts of n-butyl acrylate (BA) and 1 part of allyl methacrylate (AMA). The results are shown in Table 1.

Example 7

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the particulate polymer, 92.2 parts of n-butyl acrylate (BA) and 3.8 parts of acrylonitrile (AN) were used instead of using 94 parts of n-butyl acrylate (BA) and 2 parts of acrylonitrile (AN). The results are shown in Table 1.

Example 8

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the binder composition, 0.55 parts of sodium dioctyl sulfosuccinate was used instead of using 0.95 parts of sodium dioctyl sulfosuccinate. The results are shown in Table 1.

Example 9

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the binder composition, 2.7 parts of sodium dioctyl sulfosuccinate was used instead of using 0.95 parts of sodium dioctyl sulfosuccinate. The results are shown in Table 1.

Example 10

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the particulate polymer, 92.8 parts of n-butyl acrylate (BA), 1.6 parts of N-methylol acrylamide (N-MA) and 1.6 parts of acrylamide (AAm) were used instead of using 94 parts of n-butyl acrylate (BA), 1 part of allyl methacrylate (AMA) and 1 part of allyl glycidyl ether (AGE), and that upon preparation of the binder composition, 0.26 parts of sodium dioctyl sulfosuccinate was used instead of using 0.95 parts sodium dioctyl sulfosuccinate. The results are shown in Table 1.

Comparative Example 1

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the particulate polymer, 92 parts of n-butyl acrylate (BA) and 4 parts of itaconic acid (IA) were used instead of using 94 parts of n-butyl acrylate (BA) and 2 parts of methacrylic acid (MAA). The results are shown in Table 1.

Comparative Example 2

A particulate polymer, a binder composition for porous membranes, a slurry composition for porous membranes, a separator with a porous membrane, a negative electrode, a positive electrode, and a secondary battery were produced and evaluated as in Example 1 except that upon preparation of the particulate polymer, 93 parts of n-butyl acrylate (BA) and 3 parts of methacrylic acid (MAA) were used instead of using 94 parts of n-butyl acrylate (BA) and 2 parts of methacrylic acid (MAA), and that upon preparation of the binder composition, sodium dioctyl sulfosuccinate was not used (i.e., as-prepared aqueous dispersion containing a particulate polymer was used as the binder composition). The results are shown in Table 1.

TABLE 1

| | | | | Ex. 1 | Ex. 2 | Ex. 3 | Ex. 4 | Ex. 5 | Ex. 6 |
|---|---|---|---|---|---|---|---|---|---|
| Binder composition for porous membrane | Particulate polymer | (Meth)acrylic acid alkyl ester monomer unit | Type | BA | BA | BA | BA | BA | BA |
| | | | Amount (% by mass) | 94 | 95.3 | 94 | 95 | 94 | 94.5 |
| | | Acidic group-containing monomer unit | Type | MAA | MAA | IA | MAA | AA | MAA |
| | | | Amount (% by mass) | 2 | 0.7 | 2 | 1 | 2 | 2 |
| | | Other monomer units | Type | AN | AN | AN | AN | AN | AN |
| | | | Amount (% by mass) | 2 | 2 | 2 | 2 | 2 | 2 |
| | | | Type | AMA | AMA | AMA | AMA | AMA | AMA |
| | | | Amount (% by mass) | 1 | 1 | 1 | 1 | 1 | 0.5 |
| | | | Type | AGE | AGE | AGE | AGE | AGE | AGE |
| | | | Amount (% by mass) | 1 | 1 | 1 | 1 | 1 | 1 |
| | | Surface acid amount S (mmol/g) | | 0.25 | 0.08 | 0.45 | 0.19 | 0.25 | 0.25 |
| | | THF-insoluble content (% by mass) | | 92 | 92 | 92 | 92 | 92 | 86 |
| | Sulfosuccinic acid ester and salt thereof | | Type | Sodium dioctyl sulfosuccinate | Sodium dioctyl sulfosuccinate | Sodium dioctyl sulfosuccinate | Sodium dioctyl sulfosuccinate | Sodium dioctyl sulfosuccinate | Sodium dioctyl sulfosuccinate |
| | | | Total amount (parts by mass) per 100 parts by mass of particulate polymer | 0.95 | 0.95 | 0.95 | 1.3 | 0.95 | 0.95 |
| | Liquid phase acid amount L (mmol/g) | | | 0.042 | 0.013 | 0.072 | 0.021 | 0.049 | 0.042 |
| | L/S ratio | | | 0.168 | 0.163 | 0.160 | 0.111 | 0.196 | 0.168 |

TABLE 1-continued

| Evaluation items | | | Slurry stability at high shear rates of slurry composition | A | B | A | B | A | A |
|---|---|---|---|---|---|---|---|---|---|
| | | | Water content of porous membrane | A | A | B | A | B | A |
| | | | Heat shrinkage resistance of porous membrane | A | A | A | A | A | A |
| | | | Cycle characteristics of secondary battery | A | A | A | A | A | B |

| | | | | Ex. 7 | Ex. 8 | Ex. 9 | Ex. 10 | Comp. Ex. 1 | Comp. Ex. 2 |
|---|---|---|---|---|---|---|---|---|---|
| Binder composition for porous membrane | Particulate polymer | (Meth)acrylic acid alkyl ester monomer unit | Type | BA | BA | BA | BA | BA | BA |
| | | | Amount (% by mass) | 92.2 | 94 | 94 | 92.8 | 92 | 93 |
| | | Acidic group-containing monomer unit | Type | MAA | MAA | MAA | MAA | IA | MAA |
| | | | Amount (% by mass) | 2 | 2 | 2 | 2 | 4 | 3 |
| | | Other monomer units | Type | AN | AN | AN | AN | AN | AN |
| | | | Amount (% by mass) | 3.8 | 2 | 2 | 2 | 2 | 2 |
| | | | Type | AMA | AMA | AMA | N-MA | AMA | AMA |
| | | | Amount (% by mass) | 1 | 1 | 1 | 1.6 | 1 | 1 |
| | | | Type | AGE | AGE | AGE | AAm | AGE | AGE |
| | | | Amount (% by mass) | 1 | 1 | 1 | 1.6 | 1 | 1 |
| | | Surface acid amount S (mmol/g) | | 0.25 | 0.25 | 0.25 | 0.19 | 0.55 | 0.45 |
| | | THF-insoluble content (% by mass) | | 92 | 92 | 92 | 89 | 92 | 92 |
| | Sulfosuccinic acid ester and salt thereof | Type | | Sodium dioctyl sulfo-succinate | Sodium dioctyl sulfo-succinate | Sodium dioctyl sulfo-succinate | Sodium dioctyl sulfo-succinate | Sodium dioctyl sulfo-succinate | — |
| | | Total amount (parts by mass) per 100 parts by mass of particulate polymer | | 0.95 | 0.55 | 2.7 | 0.26 | 0.95 | — |
| | Liquid phase acid amount L (mmol/g) | | | 0.042 | 0.042 | 0.042 | 0.037 | 0.082 | 0.093 |
| | L/S ratio | | | 0.168 | 0.168 | 0.168 | 0.195 | 0.149 | 0.207 |
| Evaluation items | | | Slurry stability at high shear rates of slurry composition | A | B | A | B | B | D |
| | | | Water content of porous membrane | A | A | B | A | D | C |
| | | | Heat shrinkage resistance of porous membrane | B | A | A | A | D | C |
| | | | Cycle characteristics of secondary battery | A | A | A | B | D | C |

It can be seen from Table 1 that Examples 1 to 10, which used a binder composition comprising a particulate polymer having a surface acid amount S of 0.05 mmol/g or more and 0.50 mmol/g or less, a sulfosuccinic acid ester and/or a salt thereof, and water wherein the ratio L/S which is the ratio of an acid amount L in the liquid phase to the surface acid amount S is 0.1 or more and 0.2 or less, allowed the resulting slurry composition which comprises the particulate polymer to exert excellent slurry stability at high shear rates, provided a porous membrane having excellent heat shrinkage resistance and low water content, and provided a secondary battery having excellent cycle characteristics (life characteristics).

On the other hand, it can be seen that Comparative Example 1 in which the surface acid amount S of the particulate polymer is large provided a porous membrane having poor heat shrinkage resistance and high water content. It can be also seen that Comparative Example 1 provided a secondary battery having poor cycle characteristics (life characteristics).

Finally, it can be seen that Comparative Example 2 in which the L/S ratio is large and a sulfosuccinic acid ester and/or a salt thereof is not used particularly provide a slurry composition having poor slurry stability at high shear rates and provided a porous membrane having poor heat shrinkage resistance and high water content. It can be also seen that Comparative Example 2 provided a secondary battery having poor cycle characteristics (life characteristics).

INDUSTRIAL APPLICABILITY

According to the present disclosure, it is possible to provide a binder composition for non-aqueous secondary battery porous membranes which can increase the slurry stability at high shear rates of a slurry composition for porous membranes and which can form a porous membrane having a reduced water content.

According to the present disclosure, it is also possible to provide a slurry composition for non-aqueous secondary battery porous membranes which has excellent slurry stability at high shear rates and which can form a porous membrane having a reduced water content.

According to the present disclosure, it is also possible to provide a porous membrane for non-aqueous secondary batteries which has a reduced water content, and a non-aqueous secondary battery having the porous membrane.

The invention claimed is:

1. A binder composition for a non-aqueous secondary battery porous membrane, comprising:
   a particulate polymer;
   a sulfosuccinic acid ester and/or a salt thereof; and
   water,
   wherein the particulate polymer has a surface acid amount S of 0.05 mmol/g or more and 0.50 mmol/g or less,
   a ratio L/S which is a ratio of an acid amount L in a liquid phase of the binder composition to the surface acid amount S is 0.1 or more and 0.2 or less,
   the surface acid amount S of the particulate polymer is the surface acid amount per 1 gram of the particulate polymer contained in the binder composition, and
   the acid amount L in the liquid phase of the binder composition is the acid amount in the liquid phase per 1 gram of solids contained in the binder composition which comprises the particulate polymer and at least one of the sulfosuccinic acid ester and the salt thereof.

2. The binder composition for a non-aqueous secondary battery porous membrane according to claim 1, wherein the acid amount L in the liquid phase of the binder composition is 0.01 mmol/g or more and 0.1 mmol/g or less.

3. The binder composition for a non-aqueous secondary battery porous membrane according to claim 1, wherein the particulate polymer comprises 90% by mass or more and 96% by mass or less of a (meth)acrylic acid alkyl ester monomer unit whose alkyl group has 1 or more and 4 or less carbon atoms.

4. The binder composition for a non-aqueous secondary battery porous membrane according to claim 1, wherein a total amount of the sulfosuccinic acid ester and a salt thereof is 0.5 parts by mass or more and 3 parts by mass or less per 100 parts by mass of the particulate polymer.

5. The binder composition for a non-aqueous secondary battery porous membrane according to claim 1, wherein a tetrahydrofuran-insoluble content of the particulate polymer is 90% by mass or more.

6. A slurry composition for a non-aqueous secondary battery porous membrane, comprising:
   the binder composition for a non-aqueous secondary battery porous membrane according to claim 1; and
   non-conductive particles.

7. A porous membrane for a non-aqueous secondary battery, the porous membrane being formed from the slurry composition for a non-aqueous secondary battery porous membrane according to claim 6.

8. A non-aqueous secondary battery comprising:
   a positive electrode;
   a negative electrode;
   a separator; and
   an electrolyte solution,
   wherein at least one battery member selected from the group consisting of the positive electrode, the negative electrode, and the separator comprises the porous membrane for a non-aqueous secondary battery according to claim 7.

* * * * *